United States Patent
Gray et al.

(10) Patent No.: US 9,863,476 B2
(45) Date of Patent: Jan. 9, 2018

(54) SELF-COOLED AND-OR SELF LUBRICATED ELECTRIC MOTOR BEARING SYSTEMS

(71) Applicant: Toshiba International Corporation, Houston, TX (US)

(72) Inventors: James W. Gray, Houston, TX (US); Chetan Channapatana, Houston, TX (US); Sergio Hernandez, Houston, TX (US)

(73) Assignee: TOSHIBA INTERNATIONAL CORPORATION, Houston, TX (US)

( * ) Notice: Subject to any disclaimer, the term of this patent is extended or adjusted under 35 U.S.C. 154(b) by 204 days.

(21) Appl. No.: 13/833,638

(22) Filed: Mar. 15, 2013

(65) Prior Publication Data

US 2014/0271284 A1 Sep. 18, 2014

(51) Int. Cl.

| | |
|---|---|
| F16C 37/00 | (2006.01) |
| F16C 35/04 | (2006.01) |
| H02K 5/173 | (2006.01) |
| H02K 7/08 | (2006.01) |
| H02K 7/14 | (2006.01) |
| H02K 9/06 | (2006.01) |
| H02K 9/19 | (2006.01) |

(Continued)

(52) U.S. Cl.
CPC .......... *F16C 37/007* (2013.01); *F16C 33/664* (2013.01); *F16C 35/045* (2013.01); *H02K 5/1732* (2013.01); *H02K 7/083* (2013.01); *H02K 7/14* (2013.01); *H02K 9/06* (2013.01); *H02K 9/19* (2013.01); *F04D 13/06* (2013.01); *F04D 25/062* (2013.01); *F16C 19/30* (2013.01); *F16C 2300/34* (2013.01)

(58) Field of Classification Search
CPC ........ F04D 13/06; F04D 25/06; F04D 25/062; F04D 25/0626; F04D 29/04; F04D 29/046

USPC ..... 417/423.12, 366–368, 372; 384/322, 384
See application file for complete search history.

(56) References Cited

U.S. PATENT DOCUMENTS

| | | | |
|---|---|---|---|
| 1,750,898 A | * | 3/1930 | Magnuson ............ F04D 29/061 310/157 |
| RE18,995 E | | 11/1933 | Magnuson |

(Continued)

OTHER PUBLICATIONS

International Search Report dated Jun. 23, 2014, issued in corresponding application No. PCT/US2014/021606.

(Continued)

*Primary Examiner* — Devon Kramer
*Assistant Examiner* — Connor Tremarche
(74) *Attorney, Agent, or Firm* — Westerman, Hattori, Daniels & Adrian, LLP

(57) ABSTRACT

The preferred embodiments of the present invention provide two advantageous features, which are especially beneficial in combination, but which can be advantageously and beneficially employed independently of one another: (1) firstly, a self-cooling motor bearing system; and (2) secondly, a self-lubricating motor bearing system. In the preferred embodiments, one or both of these two advantageous features are integrated inside an electric motor (e.g., within the electric motor's enclosure housing) in such a manner as to greatly enhance bearing operating conditions (e.g., maintaining adequate bearing lubrication and/or bearing operating temperature) without the use of external lubrication units and/or external cooling units.

8 Claims, 13 Drawing Sheets

(51) Int. Cl.
    *F16C 33/66*     (2006.01)
    *F04D 25/06*     (2006.01)
    *F04D 13/06*     (2006.01)
    *F16C 19/30*     (2006.01)

(56) References Cited

U.S. PATENT DOCUMENTS

| | | | |
|---|---|---|---|
| 2,086,806 A * | 7/1937 | Hollander | F04D 1/066 |
| | | | 415/106 |
| 3,628,835 A * | 12/1971 | Cornish | F16C 19/364 |
| | | | 384/465 |
| 4,270,064 A | 5/1981 | Glandorf et al. | |
| 4,962,829 A * | 10/1990 | Sugden | F01M 11/06 |
| | | | 184/27.2 |
| 5,823,261 A * | 10/1998 | Drumheller | E21B 43/126 |
| | | | 166/105 |
| 7,815,374 B2 * | 10/2010 | Kreitzer | F16C 33/66 |
| | | | 384/241 |
| 2005/0194847 A1 | 9/2005 | Gromoll et al. | |
| 2007/0071382 A1 * | 3/2007 | Suzuki | F16C 33/6674 |
| | | | 384/462 |
| 2009/0022608 A1 * | 1/2009 | Rogner | F04C 15/008 |
| | | | 417/423.1 |
| 2009/0250197 A1 * | 10/2009 | Hassett | F28D 15/0275 |
| | | | 165/104.26 |

OTHER PUBLICATIONS

Written Opinion of the International Searching Authority dated Jun. 23, 2014, issued in corresponding application No. PCT/US2014/021606.

\* cited by examiner

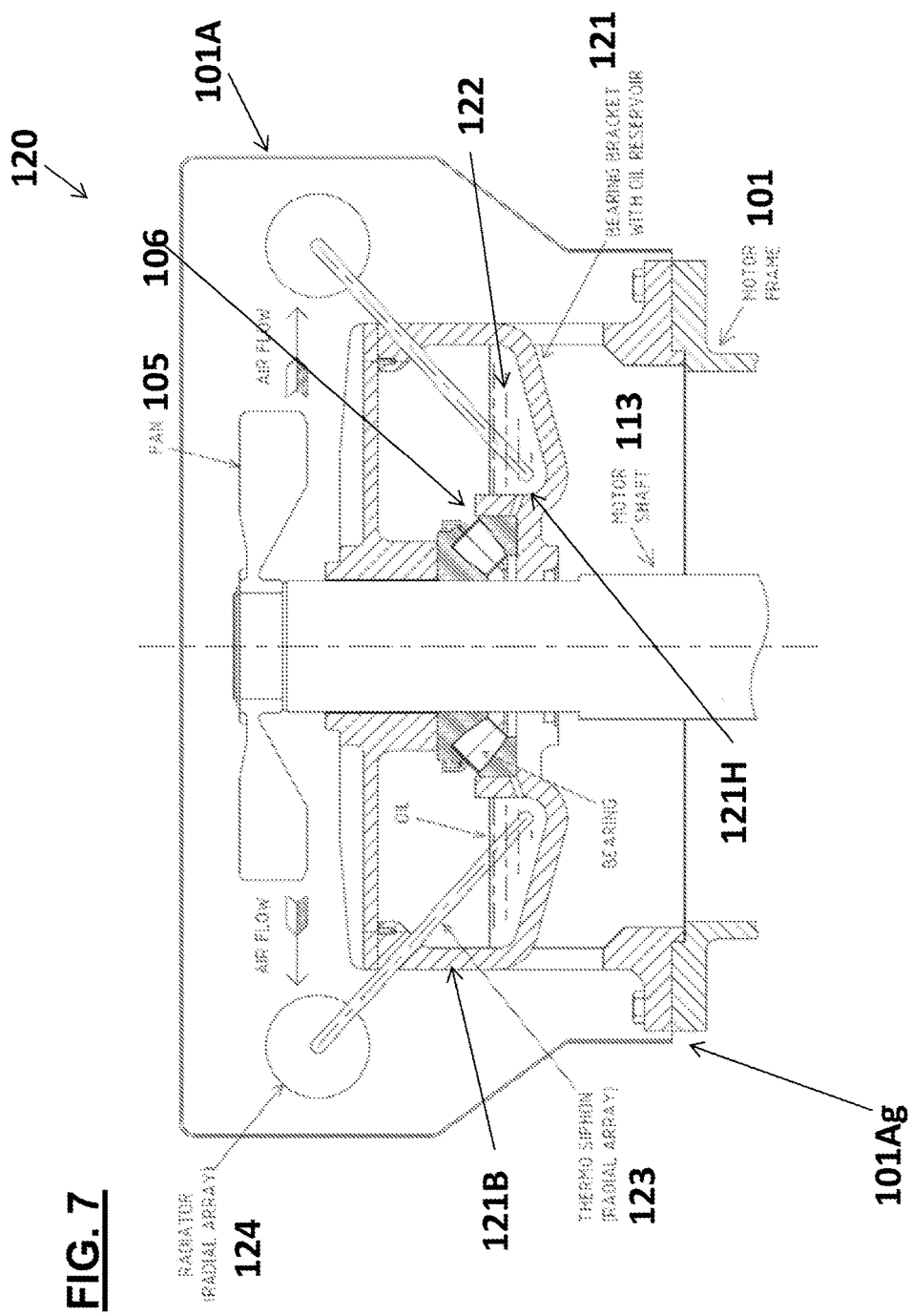

SELF-COOLED AND-OR SELF LUBRICATED ELECTRIC MOTOR BEARING SYSTEMS

BACKGROUND

The present application relates generally to the cooling and/or lubricating of motor bearings and the preferred embodiments provide novel self-cooling and/or self-lubricating features in the context of heavy duty electric motor bearing systems.

In existing electric motors that are subjected to high speeds and/or that support high thrust loads, the motor bearings can be subjected to extreme conditions. For example, in certain large industrial vertical electric motors, the motors contain an upper bearing that is subjected to wear and heat. In order to address this difficulty, manufactures have developed external lubrication and external cooling systems that seek to reduce friction and heat generated within the bearing (i.e., due to movement of the rolling elements of the bearing that travel around internal bearing raceways). However, these external lubrication and external cooling systems have been complicated and costly to manufacture and have other drawbacks.

The preferred embodiments of the present invention overcome the above and/or other problems in the background art.

SUMMARY OF THE PREFERRED EMBODIMENTS

As indicated above, the preferred embodiments of the present invention overcome the above and/or other problems in the background art.

The preferred embodiments of the present invention provide two advantageous features, which are especially beneficial in combination, but which can be advantageously and beneficially employed independently of one another: (1) firstly, a self-cooling motor bearing system; and (2) secondly, a self-lubricating motor bearing system. In the preferred embodiments, one or both of these two advantageous features are integrated inside an electric motor (e.g., within the electric motor's enclosure housing) in such a manner as to greatly enhance bearing operating conditions (e.g., maintaining adequate bearing lubrication and/or bearing operating temperature) without the use of external lubrication units and/or external cooling units.

Electric motors that are implemented with one or both of the advantageous features of the present invention—namely, the self-lubricating motor bearing system and the self-cooled motor bearing system—are highly beneficial over existing systems, such as, e.g., being advantageous and beneficial for applications where high thrust loads and/or high speeds are present during operating conditions.

In electric motors that are subjected to high speeds and/or that support high thrust loads, the motor bearings can be subjected to extreme conditions. For example, in certain large industrial vertical electric motors, the motors contain an upper bearing that is subjected to wear and heat. In order to address this difficulty, manufactures have developed external lubrication and external cooling systems that seek to reduce friction and heat generated within the bearing (i.e., due to movement of the rolling elements of the bearing that travel around internal bearing raceways). However, these external lubrication and external cooling systems have been complicated and costly to manufacture and have other drawbacks, using external pumping units (i.e., that are not incorporated inside the housing of the electric motor) that add extra cost, complication and maintenance requirements to the motor.

The preferred embodiments of the invention, including the self-lubricated motor bearing system and the self-cooled motor bearing system inventions, are easily implemented alternative approaches that can be built into an electric motor (i.e., within the housing of the electric motor) with minimal additional components.

According to some preferred embodiments employing a self-cooling motor bearing feature, a system including an electric motor having a self-cooling motor bearing component is providing that includes: (a) an electric motor; (b) a motor shaft rotated by said electric motor; (c) at least one motor bearing rotatably supporting said motor shaft within said electric motor; (d) an oil reservoir containing lubricating oil for said bearing; (e) a self-cooling motor bearing component including: (i) at least one thermosiphon having a hot-end extending within said oil reservoir and a cold-end extending outside of said oil reservoir to at least one radiator; and (ii) at least one fan arranged to direct cooling airflow over said at least one radiator, said at least one fan being rotated via said motor shaft; (f) a housing enclosure surrounding said motor shaft, said bearing and said self-cooling motor bearing component, said housing enclosure including at least one opening allowing airflow to and from said enclosure.

According to some other illustrative embodiments employing a self-cooling motor bearing feature, a system including a vertical electric motor having a self-cooling motor bearing component is provided that includes: (a) a vertical motor shaft; (b) a rotor and a stator surrounding said motor shaft and cooperatively causing said motor shaft to rotate; (c) a bearing bracket supported around said motor shaft, said bearing bracket including: i) a through-hole through which said motor shaft is rotatably received via a bearing; ii) a support surface supporting said bearing; iii) an oil reservoir containing lubricating oil for said bearing; (d) a self-cooling motor bearing component including: i) at least one thermosiphon having a hot-end extending within said oil reservoir and a cold-end extending outside of said oil reservoir to at least one radiator; and ii) at least one fan arranged to direct cooling airflow over said at least one radiator, said at least one fan being rotated via said motor shaft; (e) a housing enclosure surrounding said vertical motor shaft, said bearing bracket and said self-cooling motor bearing component, said housing enclosure including at least one opening allowing airflow to and from said enclosure.

According to some preferred embodiments employing a self-cooling motor bearing feature, a method including an electric motor having a self-cooling motor bearing component is providing that includes: (a) providing an electric motor; (b) providing a motor shaft rotated by said electric motor; (c) providing at least one motor bearing rotatably supporting said motor shaft within said electric motor; (d) providing an oil reservoir containing lubricating oil for said bearing; (e) providing a self-cooling motor bearing component including: (i) providing at least one thermosiphon having a hot-end extending within said oil reservoir and a cold-end extending outside of said oil reservoir to at least one radiator; and (ii) providing at least one fan arranged to direct cooling airflow over said at least one radiator, said at least one fan being rotated via said motor shaft; (f) providing a housing enclosure surrounding said motor shaft, said bearing and said self-cooling motor bearing component, said housing enclosure including at least one opening allowing airflow to and from said enclosure.

According to some preferred embodiments employing a self-lubricating motor bearing feature, a system including an electric motor having a self-lubricating motor bearing component is provided that includes: (a) an electric motor; (b) a motor shaft rotated by said electric motor; (c) at least one motor bearing rotatably supporting said motor shaft within said electric motor; (d) an oil reservoir containing lubricating oil for said bearing; (e) a self-lubricating motor bearing component including: (i) at least one pump arranged to pump oil from said oil reservoir through an oil passageway to a discharge position proximate said bearing; (ii) said pump being powered by rotation of said motor shaft; (f) a housing enclosure surrounding said motor shaft, said bearing and said self-lubricating motor bearing component, said housing enclosure including at least one opening allowing airflow to and from said enclosure.

According to some illustrative embodiments employing a self-lubricating motor bearing feature, a system including a vertical electric motor having a self-lubricating motor bearing component is provided that includes: (a) a vertical motor shaft; (b) a rotor and a stator surrounding said motor shaft and cooperatively causing said motor shaft to rotate; (c) a bearing bracket supported around said motor shaft, said bearing bracket including: (i) a through-hole through which said motor shaft is rotatably received via a bearing; (ii) a support surface supporting said bearing; (iii) an oil reservoir containing lubricating oil for said bearing; (d) a self-lubricating motor bearing component including: (i) at least one pump arranged to pump oil from said oil reservoir through an oil passageway to a discharge position proximate said bearing; (ii) said pump being powered by rotation of said motor shaft; (iii) a housing enclosure surrounding said vertical motor shaft, said bearing bracket and said self-lubricating motor bearing component, said housing enclosure including at least one opening allowing airflow to and from said enclosure. In some implementations, the system further includes a self-cooling component. In some examples, the self-cooling component includes a radiator arranged to impart cooling heat transfer to the oil circulated via said pump and in some examples the self-cooling component includes: (i) at least one thermosiphon having a hot-end extending within said oil reservoir and a cold-end extending outside of said oil reservoir to at least one radiator; and (ii) at least one fan arranged to direct cooling airflow over said at least one radiator, said at least one fan being rotated via said motor shaft.

According to some preferred embodiments employing a self-lubricating motor bearing feature, a method of self-lubricating an electric motor is provided that includes: (a) providing an electric motor; (b) providing a motor shaft rotated by said electric motor; (c) providing at least one motor bearing rotatably supporting said motor shaft within said electric motor; (d) providing an oil reservoir containing lubricating oil for said bearing; (e) having a self-lubricating motor bearing component carry-out self-lubricating of the bearing including: (i) pumping oil with a pump from said oil reservoir through an oil passageway to a discharge position proximate said bearing; (ii) powering said pump by rotation of said motor shaft; (f) providing a housing enclosure surrounding said motor shaft, said bearing and said self-lubricating motor bearing component, said housing enclosure including at least one opening allowing airflow to and from said enclosure.

The preferred embodiments of the invention provide advantages and benefits in a variety of electric motor applications, and have particular advantages and benefits in large industrial electric motor environments, such as, e.g., in relation to large electric motors used in industrial deep-Earth applications, such as, notably, in geothermal applications and irrigation applications. The preferred embodiments of the present invention are capable of being employed within electric motors that operate under extremely high thrust loads and/or high speeds—such as, e.g., driving vertical pumps in the following deep-Earth systems.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by a way of example, and not limitation, in the accompanying figures, in which like reference numerals indicate like parts and in which:

FIG. 7 is a partial cross-sectional side view of an illustrative embodiment of the invention similar to that shown in FIG. 5 including a self-cooling motor bearing siphon feature according to some preferred embodiments of the invention;

DETAILED DESCRIPTION OF THE PREFERRED EMBODIMENTS

While the present invention may be embodied in many different forms, the illustrative embodiments are described herein with the understanding that the present disclosure is to be considered as providing examples of the principles of the invention and that such examples are not intended to limit the invention to preferred embodiments described herein and/or illustrated herein.

The Preferred Applications

While the preferred embodiments provide advantages and benefits in a variety of electric motor applications, the preferred embodiments are particularly advantageous and beneficial in large industrial electric motor environments, such as, e.g., in relation to large electric motors used in industrial deep-Earth applications, such as, notably, in geothermal applications and irrigation applications.

The preferred embodiments of the present invention are capable of being employed within electric motors that operate under extremely high thrust loads and/or high speeds—such as, e.g., driving vertical pumps in the following deep-Earth systems.

Geothermal Pump Systems:

In this regard, geothermal energy is a type of thermal energy generated and stored at depths within the Earth's crust. By way of example, geothermal energy can be employed in power plants in order to produce electricity (e.g., by converting geothermal energy into usable electricity for use by consumers, industry, etc.) or it can be used directly within various heat transfer applications. In power plants that produce geothermally-generated electricity, wells are bored deep down into the Earth's crust in order to reach high temperature underground reservoirs. These reservoirs can be more than a mile below the Earth's ground surface, and can sometimes be two or more miles deep below the ground surface. After the wells are created by drilling down to such underground reservoirs, high-pressure hot water is extracted back up to the ground surface by the action of electrically powered vertical pumps. These electrically powered vertical pumps are subjected to extreme conditions, in terms of a) high-pressures, b) high-temperatures, and c) highly corrosive conditions (i.e., due to the highly caustic nature of the elements within the Earth's core). After the high-pressure hot-water reaches the ground surface, it can be redirected to a power plant facility that converts the high-pressure hot-water into electricity, including using heat transfer equipment and turbines that are linked to electricity generators. Typically, the water that is used in the process is injected back into the reservoir by the action of vertical pumps for reheating.

Figure 1:
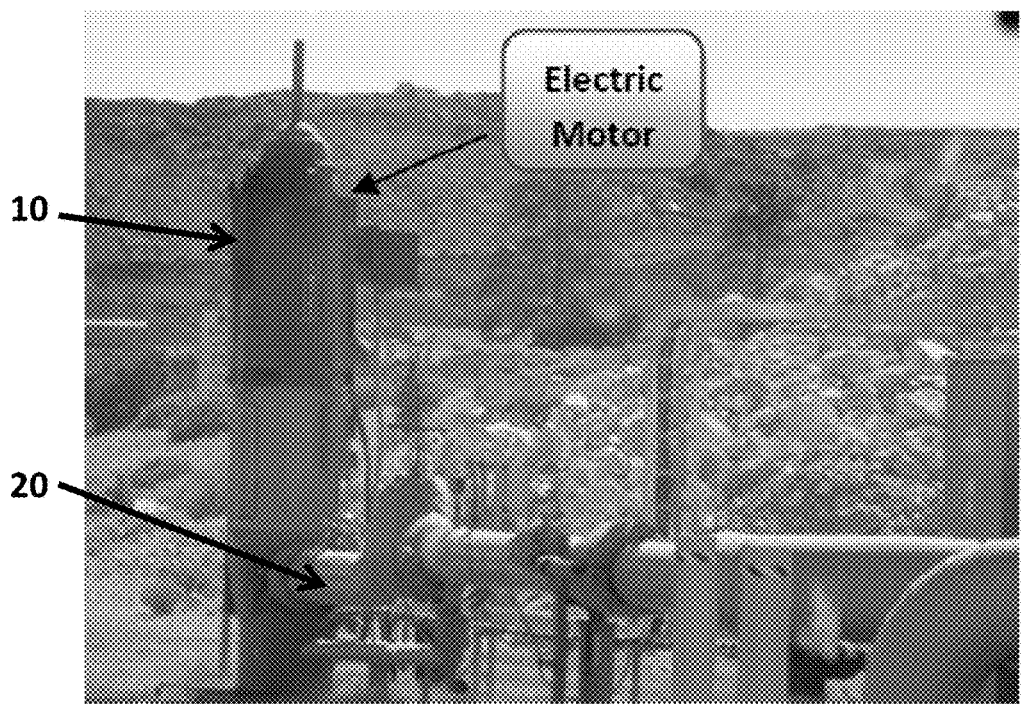
FIG. 1 shows an illustrative electric motor 10 according to some preferred embodiments of the invention used to drive a vertical pump in a geothermal power plant.

For reference, FIG. 1 shows an illustrative electric motor 10 used in an illustrative geothermal pump system according to some illustrative embodiments. As depicted, the electric motor 10 is mounted above the ground surface in a substantially vertical orientation (e.g., a drive shaft of the vertical electric motor extends substantially vertically), and the vertical electric motor is used to power at least one pump located deep beneath the ground surface and to discharge water through the discharge piping 20. In this disclosure, the terminology vertical is not used as a mathematical term identifying an exact right angle from horizontal, but is used as a general expression to indicate a generally upright orientation—such that vertical can encompass angles tilted from a true vertical of more than even 10 degrees, or more than 20 degrees or even more in some examples.

Figure 3:
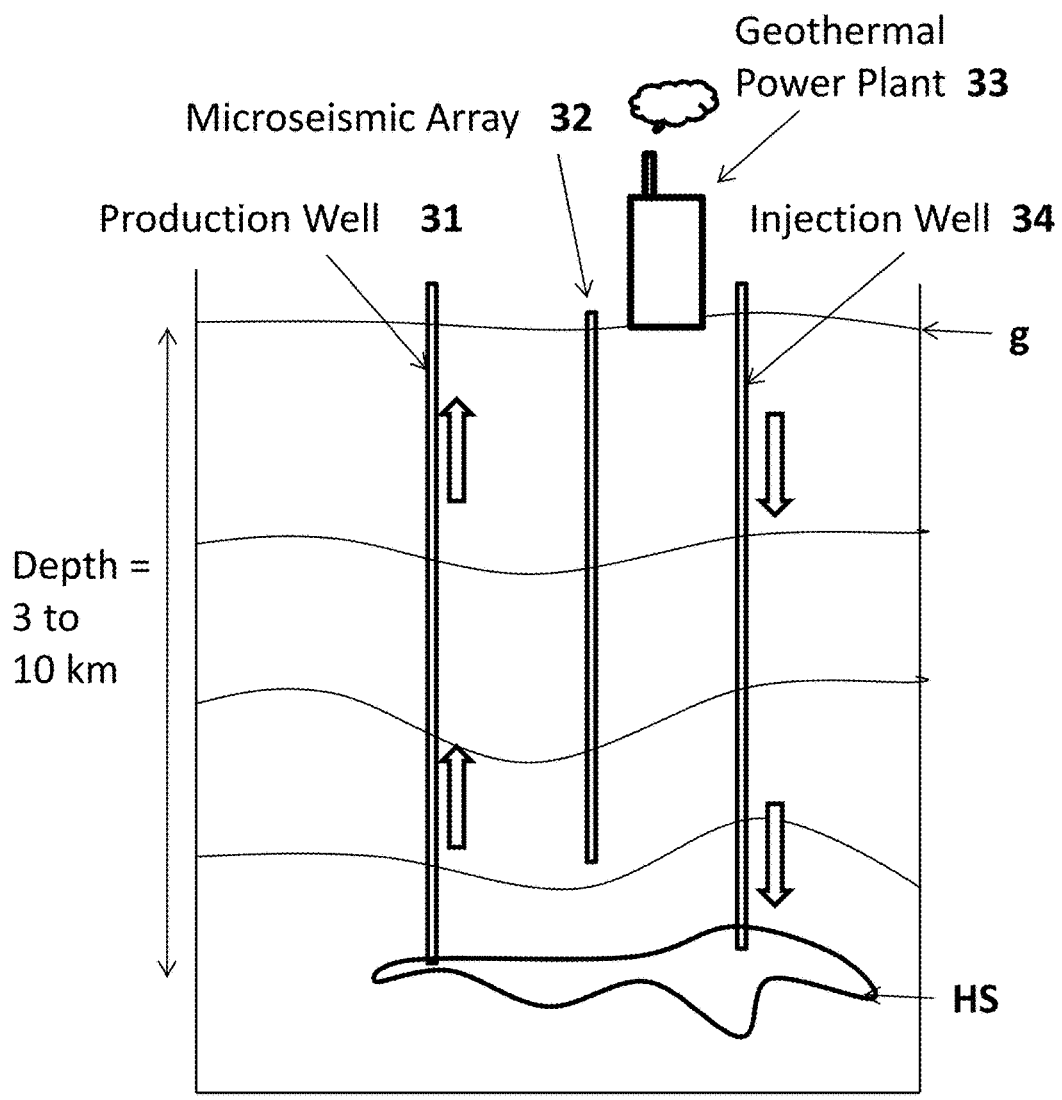
FIG. 3 is a schematic diagram showing an illustrative geothermal power plant environment within which embodiments of the present invention can be implemented.

For illustrative purposes, one or more electric motor 10 can be employed to drive a vertical pump in the context of a geothermal power plant as depicted in FIG. 3. In this regard, as shown in FIG. 3, a motor 10 (not shown in FIG. 3) can be employed at the top of a production well 31 (e.g., having a long tube or conduit extending down to a very hot ground water source HS). In some instances, this depth can be over a kilometer, and even about 3 to 10 kilometers in some illustrative examples. In some embodiments, a microseismic array 32 can be used to monitor the below-ground wells (such as, e.g., employing devices made by MICRO-SEISMIC, INC.). In some embodiments, the discharged heated groundwater is directed to a geothermal power plant 33. Moreover, in some embodiments, the water can be returned to the ground via another motor 10 (not shown in FIG. 3) after processing within the geothermal power plant 33 via an injection well 34.

Agriculture Irrigation Pump Systems:

By way of example, an illustrative agriculture irrigation vertical pump includes a pump (such as, e.g., a centrifugal pump) installed deep underground proximate an underground water source, the pump being attached by a shaft to an electric vertical motor mounted on at the ground surface. Typically, the shaft extends down through the center of a large pipe. In operation, the water is pumped up through this pipe and directed outward to an agricultural field.

By way of example, electric motors that are used in geothermal and irrigation applications are often subjected to high thrust loads (for example, in some geothermal applications the thrust loads can be over 25,000 lbs., and can even up over 50,000 lbs., and can even be up to 55,000 lbs.) due to the construction of the vertical pumps, which often consists of multiple stages (impellers). In some illustrative systems, each stage is essentially another pump stacked on top of the one below like a train with multiple engines hitched together with all of them pulling down.

By way of another example, agricultural irrigation pump systems and geothermal pump systems are often subjected to high speeds. For example, in some geothermal systems, the vertical electric motors drive pumps at speeds of over 1000 revolutions per minute, and even at speeds of over 2000 revolutions per minute, and even at speeds of over 2400 revolutions per minute.

Figure 4:
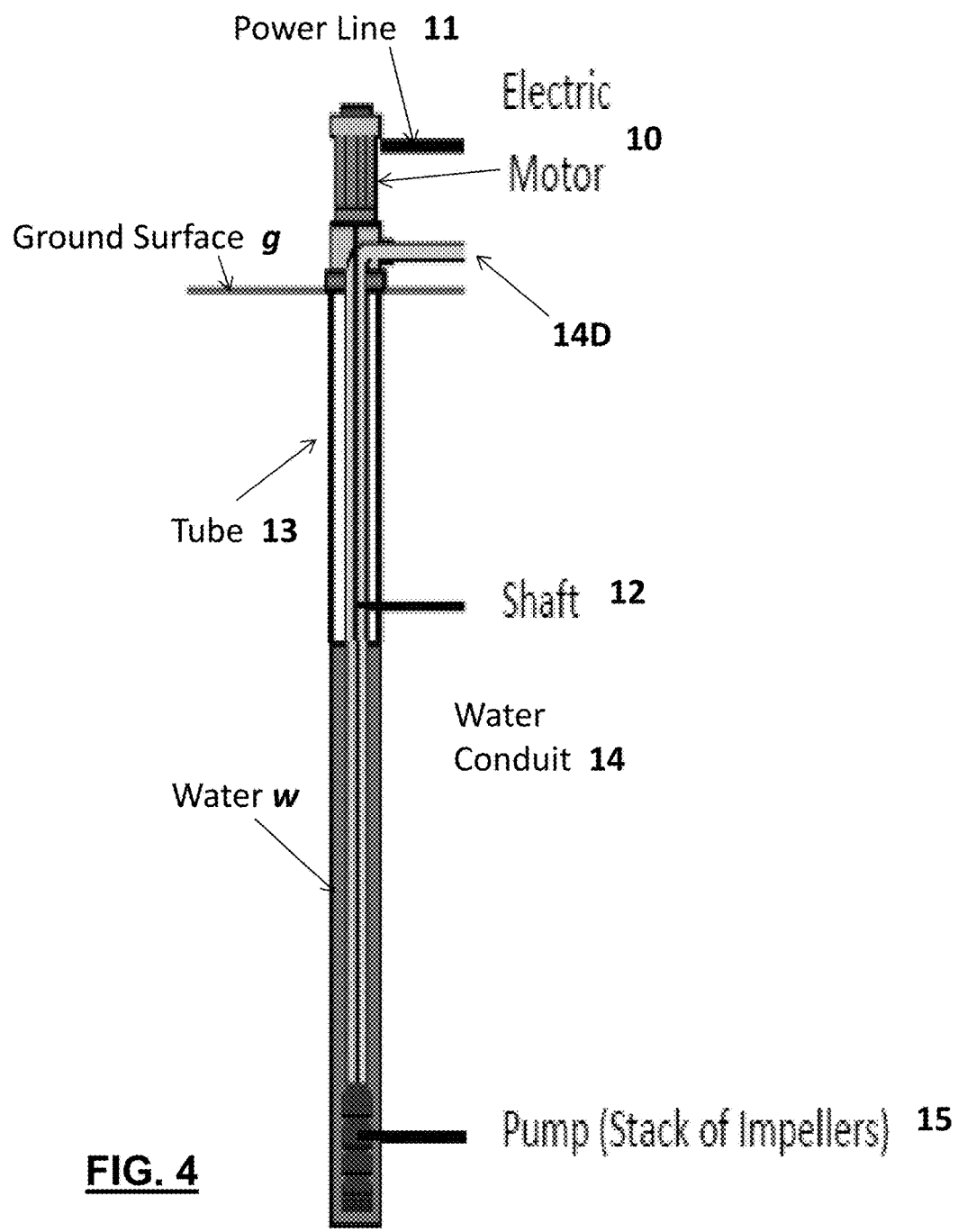
FIG. 4 is a schematic diagram illustrating a cross-sectional side view of an illustrative embodiment of the present invention in an agricultural irrigation environment.

For illustrative purposes, one or more pump(s) 10 can be employed in the context of an irrigation pump system as depicted in FIG. 4. In the illustrative example shown in FIG. 4, a vertically electric motor 10 rotates a shaft 12 that extends below the ground surface g inside a well tube 13 that extends deep into the ground to a ground water source. As in the geothermal embodiment, in some examples, the tube 13 can extend to depths of over a few hundred feet, to over a thousand feet, to even over a kilometer or more. In some embodiments, as shown, the shaft 12 connects to a pump 15 that is located proximate the bottom of the tube 13 such as to pump water w that enters the bottom of the tube 13 from a ground water source. In operation, the water w is driven up the water conduit 14 and laterally away for processing (such as, e.g., for irrigation of crops or the like) at 14D (such as, e.g., via above ground conduits and/or the like).

The Preferred Embodiments

The preferred embodiments of the present invention provide two advantageous features, which are especially beneficial in combination, but which can be advantageously and beneficially employed independently of one another: (1) firstly, a self-cooling motor bearing system; and (2) secondly, a self-lubricating motor bearing system. In the preferred embodiments, one or both of these two advantageous features are integrated inside an electric motor (e.g., within the electric motor's enclosure housing) in such a manner as to greatly enhance bearing operating conditions (e.g., maintaining adequate bearing lubrication and/or bearing operating temperature) without the use of external lubrication units and/or external cooling units.

Electric motors that are implemented with one or both of the advantageous features of the present invention—namely, the self-lubricating motor bearing system and the self-cooled motor bearing system—are highly beneficial over existing systems, such as, e.g., being advantageous and beneficial for applications where high thrust loads and/or high speeds are present during operating conditions.

In electric motors that are subjected to high speeds and/or that support high thrust loads, the motor bearings are subjected to extreme conditions. For example, in certain large industrial vertical electric motors, the motors contain an upper bearing that is subjected to wear and heat. In order to address this difficulty, manufactures have developed external lubrication and external cooling systems that seek to reduce friction and heat generated within the bearing (i.e., due to movement of the rolling elements of the bearing that travel around internal bearing raceways). However, these external lubrication and external cooling systems have been complicated and costly to manufacture and have other drawbacks, such as, e.g., requiring external pumping units (i.e., that are not incorporated inside the housing of the electric motor) and that add extra cost, complication and maintenance requirements to the motor.

The preferred embodiments of the invention, including the self-lubricated motor bearing system and the self-cooled motor bearing system inventions, are easily implemented alternative approaches that can be built into an electric motor (i.e., within the housing of the electric motor) with minimal additional components.

Self-Cooled Motor Bearing System

In some preferred embodiments, a self-cooled motor bearing system is provided within the housing of an electric motor that includes a thermosiphon for cooling of the motor. The motor driven self-cooled motor bearing system advantageously maintains an adequate bearing operating temperature without the use of an external cooling unit.

In the preferred embodiments, a self-cooled bearing system achieves an optimum bearing operating temperature by removing the heat from the lubricating oil through the use of a radial array of thermo-siphons and a radiator. In the preferred construction, one end of the thermosiphons (i.e., the hot-end) is submerged into the heated oil reservoir and the other end of the thermosiphon (i.e., the cool-end) is located outside the reservoir and connected to a radiator. In the preferred embodiments, the heat conducted from the hot-end to the cool-end of the thermosiphon is dissipated in the radiator by the aid of an air flow produced by a fan mounted on the shaft of the motor. Among other benefits, this design integrates a cooling system inside the body of the electric motor so that an external bearing cooling system is no longer required.

As discussed above, a first inventive feature of the present invention involves a novel self-cooling motor bearing system. In the following paragraphs, some illustrative embodiments of such a self-cooled motor system are described further in reference to FIGS. 5 to 8.

Figure 5:
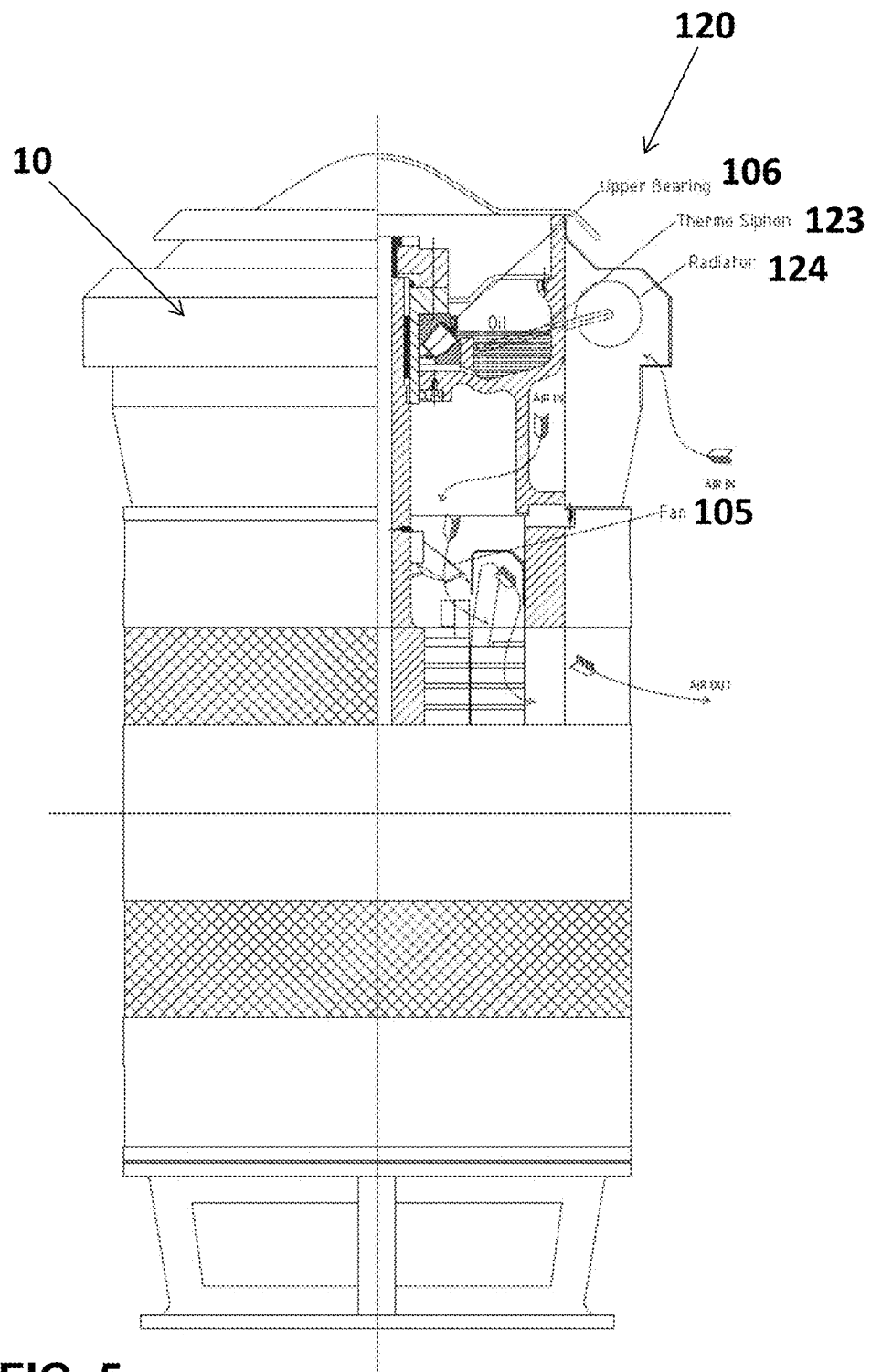
FIG. 5 is a partially cross-sectional side view of an illustrative embodiment of the invention including a self-cooling motor bearing siphon feature according to some preferred embodiments of the invention.

In this regard, FIG. 5 is a partial cross-sectional side view of an illustrative embodiment of the invention including a self-cooling motor bearing siphon feature 120 according to some preferred embodiments of the invention. FIG. 5 depicts an electric motor 10 as seen from outside the electric motor housing enclosure, but with a small portion of the enclosure depicted as cut-away at the upper right portion of the figure so as to illustrate the location of the components of an illustrative self-cooling motor bearing siphon feature 120 according to some illustrative embodiments, which components are more plainly depicted in FIG. 6. In that regard, FIG. 6 is a cross-sectional side view of an illustrative embodiment of the invention similar to that shown in FIG. 5 including a self-cooling motor bearing siphon feature 120 according to some preferred embodiments of the invention.

Figure 6:
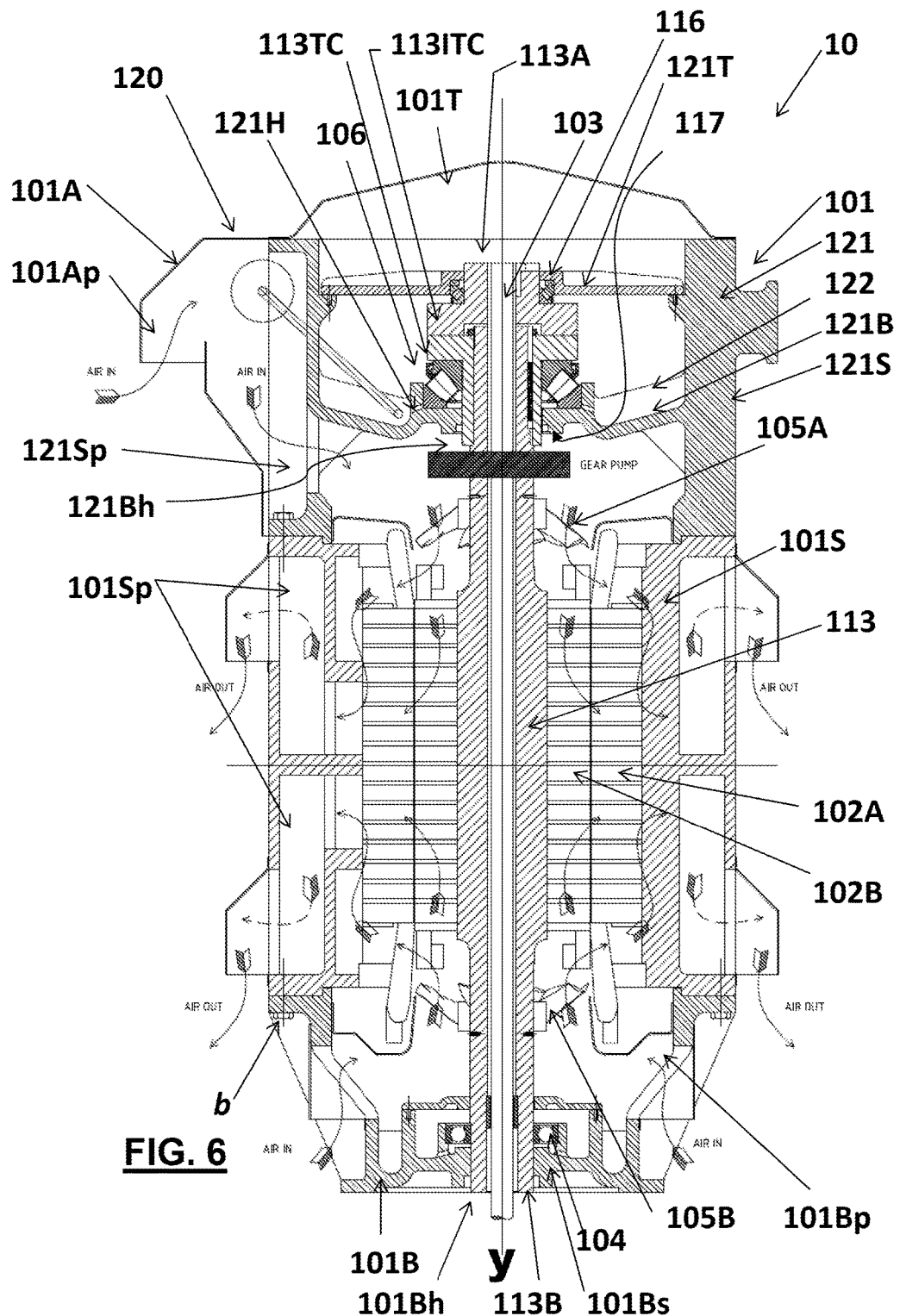
FIG. 6 is a cross-sectional side view of an illustrative embodiment of the invention similar to that shown in FIG. 5 including a self-cooling motor bearing siphon feature according to some preferred embodiments of the invention.

As shown in FIG. 6, in some embodiments, the electric motor 10 includes, e.g., an outer stator 102A and an internal rotor 102B (for example, the outer stator can include an electromagnet coil or field winding that is connected to a power source, such as, e.g., an AC power supply like that of the example shown in FIG. 6 or a DC power supply, and the internal rotor can include, e.g., solid bars of, e.g., copper or other metal like that of the example shown in FIG. 6 or an electromagnetic coil with a magnetic field arranged so that a torque is developed around the rotor's axis, as is known in the art). It should be understood that the electric motor can comprise any known electric motor technology and may include, e.g., DC motors (e.g., shunt DC motor where rotor and stator windings are connected in parallel, separately excited motors where the rotor and stator are connected from different power supplies, series motors, where the stator and rotor are connected in series, permanent magnet motors in which the stator is a permanent magnet [although, such permanent magnet motors would likely have lower torques than contemplated in the preferred embodiments], compound motors), AC motors (e.g., induction motor, synchronous motor), brushless DC motors and/or various other electric motors.

Figure 2:
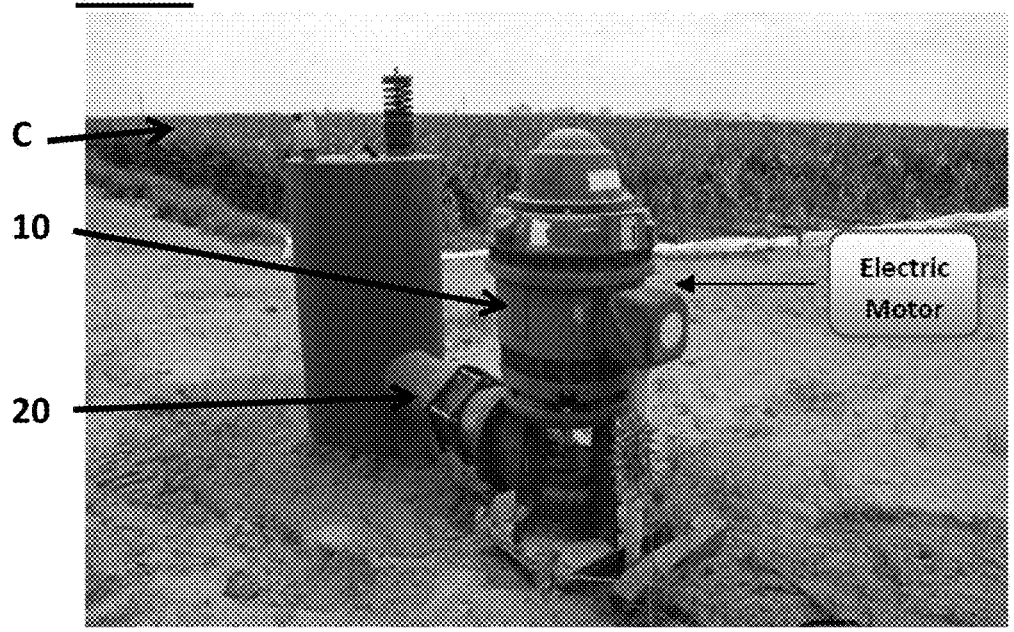
FIG. 2 shows an illustrative electric motor 10 according to some preferred embodiments of the invention used to drive a submergible pump for agricultural irrigation.

In the example shown in FIG. 6, the shaft 103 is fixedly mounted and retained within a shaft-supporting motor-driven tube 113 that is supported within the motor housing 101 such as to be free to rotate within the motor housing 101. In this illustrative example, the tube 113 includes a widened annual collar 113A that is supported upon the top bearing 106 and beneath an uppermost bearing 116. In addition, a lower end 113B of the tube 113 is rotatably supported via a lower bearing 104. In this manner, the motor is configured such as to rotate the shaft 103 around a vertical axis y. In addition, the motor-driven tube 113 is configured so as to fixedly support the internal rotor 102B there-around, whereby rotation of the rotor 102B will impart rotation to the tube 113, and, hence, rotation to the shaft 103. On the other hand, the outer stator 102A is fixedly attached to the motor housing 101, which housing 101 is, in turn, fixedly mounted with respect to the environment (such as, e.g., fixedly mounted upon a support or upon the ground such as, e.g., shown in FIGS. 1 and 2). In operation, the tube 113 operates as a motor shaft, while the shaft 103 operates as, e.g., an underground pump shaft. In some implementations in which the device shown in FIG. 6 is sold or otherwise provided to a facility (such as, e.g., a geothermal or irrigation facility), the shaft 103 can be a shaft of the facility or customer. While the illustrative example shown in FIG. 6 employs a hollow motor shaft 113, in some embodiments, the motor shaft 113 can be solid and can otherwise connect to the shaft 103 (such as, e.g., in an end-to-end coupling fashion, rather than co-axially). For geothermal applications, the motor shaft is preferably hollowed, while for irrigation applications, the motor shaft can preferably be either hollowed or solid. However, such can be varied by those in the art to suit particular needs or circumstances.

According to some preferred embodiments, the housing 101 is generally cylindrical with a cylinder 101S to which the stator 102A is fixed. In the illustrated embodiment, the bottom end of the cylinder 101S is covered by a bottom cap 101B, which is attached to the cylinder 101S via a plurality of bolts b in the illustrated example. As shown, the bottom cap 101B includes an annular bearing support 101Bs for supporting a bottom bearing 104, and a through-hole 101Bh for allowing the shaft 103 to extend down distally from the motor 10 such as, e.g., to drive pumps or the like as in, e.g., the illustrative preferred applications described above. In the preferred construction, the cylinder 101S further includes a plurality of air hole paths 101Sp in order to enable air to freely flow there-through (see arrows depicting airflow out of the cylinder 101S). Similarly, in the preferred embodiments, the bottom cap 101B further includes a plurality of air hole paths 101Bp in order to enable air to freely flow there-through (see arrows depicting airflow in to the bottom cap 101B).

As also shown in FIG. 6, in order to impart cooling airflow over the electric motor components, the rotated tube 113 preferably includes at least one fan 105 (e.g., which can include any type of fan, such as, e.g., as shown a fan having a set of angled fan blades) mounted thereon in order to effect movement of air there-through. In the preferred embodiments, the fan 105 is fixedly mounted to the tube 113, whereby rotation of the tube will impart rotation to the fan 105 and, hence, cause air to flow as shown. In some preferred embodiments, as shown, the at least one fan 105 includes a first upper fan 105A and a second lower fan 105B. Preferably, as shown, the blades are tapered in such a manner that rotation of the motor, when driven, will cause the air to flow downward to the electric motor stator and rotor from the upper fan 105A and upward to the electric motor stator and rotor from the lower fan 105B (as depicted by the illustrative arrow flow paths shown in FIG. 6).

According to the preferred embodiments, the top end of the cylinder 101S is covered by a bearing bracket 121, which is attached to the cylinder 101S via a plurality of bolts b in the illustrated example. In the preferred embodiments, the bearing bracket 121 is constructed such as to support the bearing 106 thereon. In this regard, the bearing 106 can include any known type of bearing, and preferably includes a plurality of rollers that are supported within an annular raceway or track, as shown. In some embodiments, the shape of the rollers can be spherical, cylindrical or another appropriate shape enabling low-friction rolling within an annular raceway or track. As also shown in FIG. 6, the annular raceway can have any appropriate construction, and in some embodiments, includes one annular member (e.g., a lower annular member as shown) fixed to the bearing bracket and another annular member (e.g., an upper annular member as shown) fixed in relation to the motor shaft, with the rollers being rotatably retained between such annular members.

In the preferred embodiments, the bearing bracket 121 is specially constructed so as to incorporate a self-cooling motor bearing feature of the present invention. In this regard, the bearing bracket 121 preferably includes a generally cylindrical outer wall 121S, which preferably includes a plurality of through paths 121Sp that permit airflow there-through (such as shown by the illustrative air in arrows depicted in FIG. 6). The bearing bracket 121 also preferably includes a basin 121B for holding oil 122.

In the preferred construction, the center of the bearing bracket 121 includes a through hole 121Bh that rotatably receives the tube 113 therethrough. In the illustrated embodiment, the tube 113 includes a T-shaped collar 113TC, having a tubular portion that is fixed around the tube 113 and a top flange portion that extends over and supports the raceway of the bearing 106. In the preferred embodiments, to enhance the seal between the through hole 121Bh and the tubular portion of the collar 113TC, a fluid seal member, such as, e.g., a flexible o-ring 117 is employed.

In the preferred embodiments, the oil 122 functions as a lubricating oil that reduces friction within the bearing 106. In the illustrated embodiment, at least one oil passageway or hole 121H is formed that allows oil to pass between the bearing 106 and the oil 122 within the basin 121B.

According to the preferred embodiments, at least one thermosiphon 123 is mounted so as to extend through the peripheral wall of the bearing bracket 121 and into the oil 122. In the preferred embodiments, a plurality of such thermosiphons 123 are employed so as to provide a radial array of thermosiphons 123 extending into the basin 121B. In the preferred embodiments, the thermosiphons are configured such as to conduct heat from the oil outward through the wall of the basin 121B and to at least one external radiator 124.

In the preferred embodiments, an optimum bearing operating temperature can, thus, be advantageously achieved by removing heat from the lubricating oil by the use of a thermosiphons and a radiator. In the preferred embodiments, the thermosiphon is preferably made with a heat conductive material, and, most preferably, a heat conductive metal material. While materials such as, e.g., copper, aluminum, brass, carbon and/or other metal materials can be employed in some illustrative embodiments, in some preferred embodiments the thermosiphon (e.g., the tubing material) is constructed with stainless steel. While stainless steel is more costly and may have higher cost and/or other drawbacks over some other materials, stainless steel is beneficial when applied in, e.g., deep-Earth applications, such as, e.g., geothermal energy systems in which highly corrosive elements from the deep Earth environment can lead to corrosion of other metals. In some illustrative embodiments, thermosiphons can be configured similar to those made by SUMITOMO.

The particular construction of the thermosiphon(s) can vary based on circumstances. In some examples, coil type thermosiphons can be employed. In some preferred embodiments, as shown in FIG. 8(B), the thermosiphon can include a closed loop tube 123T that extends between the hot oil 122 and the radiator 124 within which a refrigerant is free to flow due to evaporation of the refrigerant due to conduction through the wall of the tube 123T up to the radiator 124 at which point the refrigerant condenses and returns through the return path (right side) back towards the hot-end at the oil to repeat the cycle.

Figure 8A:
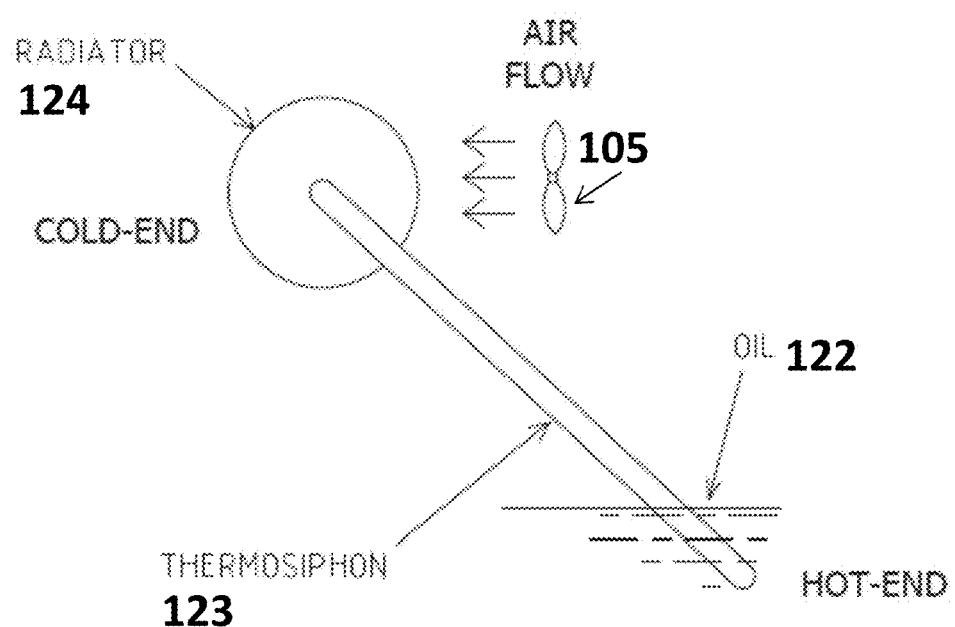
FIG. 8(A) is a schematic diagram demonstrating the operation of a self-cooling motor bearing siphon feature according to some preferred embodiments of the invention.
Figure 8B:
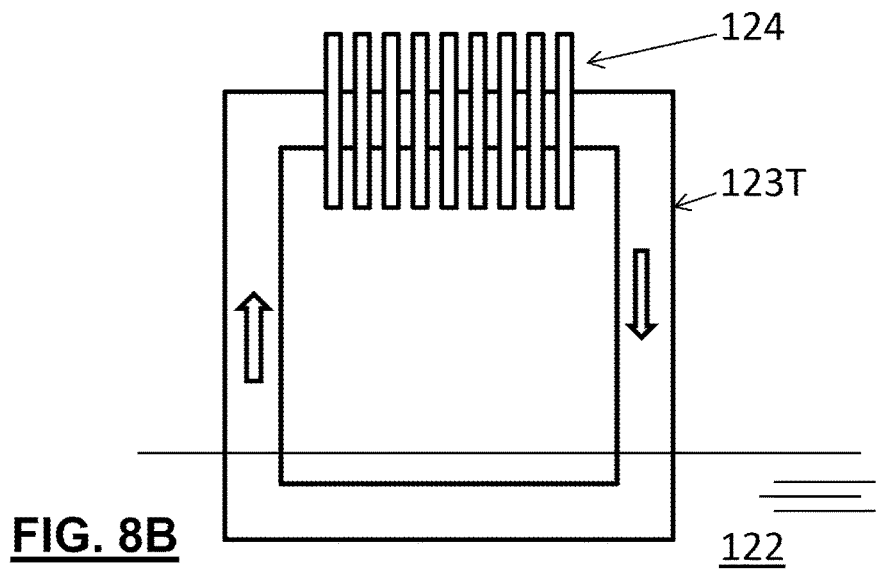
FIG. 8(B) is a schematic diagram showing an illustrative loop thermosiphon configuration.
Figure 8C:
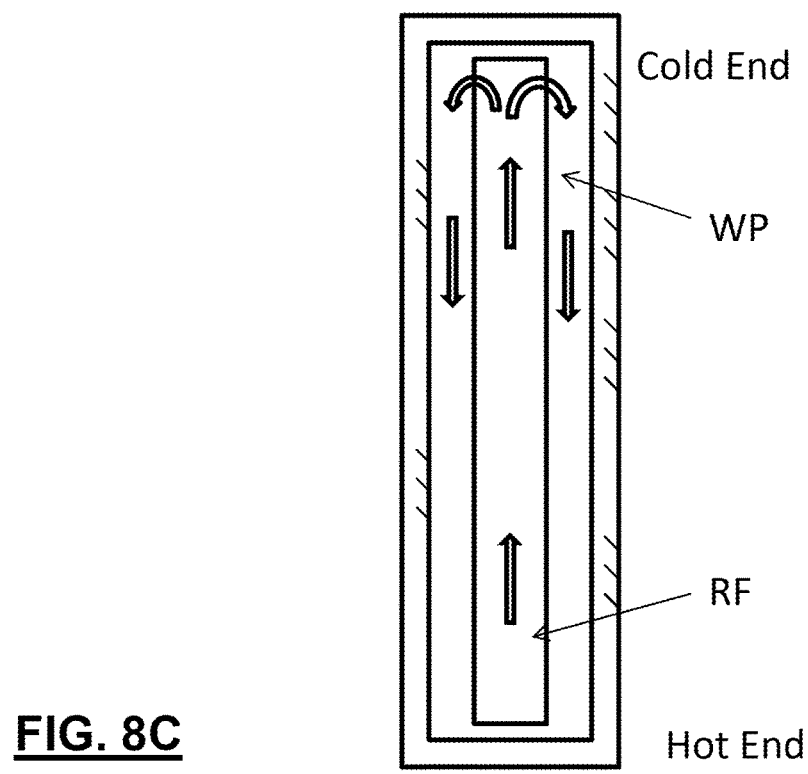
FIG. 8(C) is a schematic diagram showing an illustrative heat pipe type thermosiphon configuration.

In some other examples, sealed tube type thermosiphons can be employed, in which an evaporator and a condenser are at opposite ends of a bundle of straight individual thermosiphon tubes, with exhaust and supply ducts being adjacent to one another similar to a common heat pipe (see, e.g., heat pipe shown in FIG. 8(C)). In some illustrative embodiments, the thermosiphon(s) operate due to the temperature difference (between the heated oil 122 and the radiator 124) causing internal refrigerant to circulate between the evaporator (i.e., the hot-end within the oil 122) and the condenser (i.e., the cold-end within the radiator 124).

In the preferred embodiments, a thermosiphon provides a very easy to implement heat exchanger, without requiring, e.g., a compressor and/or other moving components (other than the use of one or more fan 105 in some embodiments), and the fluid refrigerant can flow by natural convection and gravity.

In some embodiments, the thermosiphon 123 can be constructed similar to a heat pipe as shown in FIG. 8(C). In that regard, in the exemplary embodiment shown in FIG. 8(C), the internal refrigerant RF is heated at a hot-end by the oil and evaporates to vapor such as to absorb energy and flows upward to the lower temperature region at the cold-end and condenses back to fluid and is absorbed in an outer wick portion WP, releasing energy. The refrigerant then flows back to the hot-end and the cycle repeats. Although the configuration in FIG. 8(C) is sometimes referred to as a heat pipe, in this disclosure, the terminology thermosiphon is intended to also encompass such a heat pipe. Specifically, in this disclosure, the terminology thermosiphon encompasses any and all heat exchangers within which heat exchange occurs between a hot-end and a cold-end without employing a compressor or the like moving parts.

In the illustrated embodiment, the top end of the tube 113 includes an inverted-T-shaped collar 1131TC that is fixedly mounted to the T-shaped collar 113TC and which supports another bearing 116 between the inverted-T-shaped collar 1131TC at a top 121T of the bearing bracket 121, which is fixedly mounted to the cylinder 121S and which includes a central hole within which the top of the inverted-T-shaped collar 1131TC is rotatably supported via the ring bearing 116.

In the preferred embodiments, the bearing bracket is further enclosed within a top cover 101A which forms an upper portion of the housing. In some embodiments, the top cover 101A can include a top 101T and an annular cylindrical wall within which air flow paths 101Ap can be formed as shown in FIG. 6.

In operation, the rotation of the motor 10, which can operate at high thrust loads and/or at high rotational speeds or rates, can lead to high frictional forces within the bearing 106, and, hence, increased heating of the bearing 106. However, according to this preferred embodiment, the heat will be transferred from the bearing 106 into the oil 122 within the basin 121B and, in turn, the heat will be conducted from the oil 122 within the basin outward to an array of at least one radiator(s) 124 and, in turn, within the air stream flowing around the motor 10 imparted by at least one fan 105. In this manner, the temperature of the electric motor 10 can be maintained within an optimal range even without the use of external cooling systems.

For further reference, FIG. 7 shows another embodiment of the bearing bracket and structure similar to that shown in FIG. 6 with some modifications. First, in the embodiment shown in FIG. 7, the motor shaft 103 is modified and has a simplified structure that passes through the bearing bracket 121. Second, in the embodiment shown in FIG. 7, the bearing bracket 121 only supports and contains a ring bearing 106. Third, in the embodiment shown in FIG. 7, a fan 105 is mounted within the cover 101A at the distal end of the motor shaft 103. In the embodiment shown in FIG. 7, the cover 101A can be adapted as desired to include air paths to facilitate cooling airflow into the motor housing similar to that shown in FIG. 6. Alternatively, or additionally, in the example shown in FIG. 7, a gap 101Ag can be provided between the cover 101A and the bearing bracket in order to allow for air flow in-and-out of the cover 101A.

For further reference, FIG. 8A is a schematic diagram demonstrating the operation of a self-cooling motor bearing feature according to some preferred embodiments of the invention. As depicted in FIG. 8A, according to the preferred embodiments of this feature of a self-cooled motor bearing, the system preferably operates schematically as follows. In particular, at least one thermosiphon 123 is provided so as to extend between an oil reservoir 122 at a hot-end and a radiator 124 at a cold-end. In the preferred embodiments, heat transfer from the radiator 124 at the cold-end is further enhanced by increasing convective heat transfer through the use of one or more fan 105 to further draw heat from the system. Among other things, locating the hot-end of a thermosiphon within a fluid in this manner, rather than within a solid heat source (such as, e.g., within a metal block) can lead to improved heat transfer due to flowing characteristics of the fluid. In some embodiments, the heat transfer from the oil liquid to the thermosiphon 123 at the hot-end can be further enhanced by mechanically increasing flow of the oil 122 with respect to the thermosiphon's hot-end, if desired. By way of example, in some embodiments, a pump, such as, e.g., a gear pump shown in FIG. 6 can be employed to circulate the oil 122.

Among other things, the embodiments depicted in FIGS. 5-7 are most beneficial and advantageous when applied within an electric motor having a substantially vertical motor drive shaft, as in the illustrated embodiments. Among other things, in such an arrangement the oil 122 can be readily maintained at a level in which the oil flows to-and-from the bearing 106 around the entire bearing. That is, as the bearing 106 preferably forms an annular ring as discussed above, by having a substantially vertical axis, the height of all of the rollers within the bearing channel with respect to the oil level can be more consistent, whereby a more consistent amount of oil to and from all parts of the bearing 106 can readily be maintained. However, if the axis is substantially tilted, then such would lead to portions of the bearing 106 being at different levels, thus leading to inconsistent oil amounts at different annular portions of the bearing. For example, if the axis were entirely horizontal, then the rollers within the bearing 106 at the peak of the path could be very distal from the top level of the oil. Nevertheless, while this embodiment is most advantageous in a substantially vertical electric motor environment, it is also applicable to other non-vertical arrangements. While the oil level within the basin 121B preferably does not extend over so as to entirely submerge the bearing 106 (e.g., with the drawings showing an illustrative embodiment of the relationship of the oil height to the bearing, to scale, as an illustrative example), in some embodiments the bearing 106 could be entirely submerged such that the angle over the motor shaft would be less consequential in this regard. Moreover, in some embodiments, the electric motor can include features to redirect oil to the bearing 106 (such as, e.g., similar to that described below) in a manner to facilitate variations in motor shaft orientation. Nevertheless, in some preferred embodiments, the motor shaft is substantially vertical, such as, e.g., less than about 10 degrees from true vertical, or, more preferably, less than about 5 degrees from true vertical.

As indicated above, in some embodiments a motor can be constructed that includes only this first self-cooling feature without the below-described second self-lubricating feature. However, in some preferred embodiments, a motor can be constructed that incorporates both the first self-cooling feature and the below-described self-lubricating feature, leading to advantages of both of these features and other synergistic benefits there-from.

Self-Lubricated Motor Bearing Systems

As discussed above, a second inventive feature of the present invention involves a novel self-lubricated motor bearing system. Illustrative embodiments of such a self-lubricated motor bearing system are depicted in FIGS. 9 to 13. As also discussed above, in some embodiments, this second inventive feature can be used to improve the operation of a motor without the use of the above-described first inventive feature. However, in some preferred embodiments, as discussed above, both the first and second inventive features are employed together. Among other things, the first and second inventive features can be readily configured together (such as, e.g., being implemented within the same bracket structure).

In some embodiments according to the second inventive feature, a self-lubrication bearing system is provided within the housing of an electric motor that includes a pump mechanism mounted that is actuated by the rotation of the motor shaft. During operation, the oil is drawn from an oil reservoir within a bearing bracket by the pump, which further pumps the oil through a pipe-valve array that allows a necessary amount of oil to circulate through a radiator for cooling down before it reaches the bearing. In preferred embodiments, the pipe-valve array forces any unnecessary or excess oil to return to the reservoir. In the preferred embodiments, the self-lubricating bearing system is integrated within the housing (i.e., enclosure) of the motor, whereby external bearing lubrication systems commonly used in the electric motor market is not required.

As discussed above, a second inventive feature of the present invention involves a novel self-lubricated motor bearing system. Illustrative embodiments of such a self-lubricated motor bearing system are depicted in FIGS. 9 to 12(B).

Figure 9:
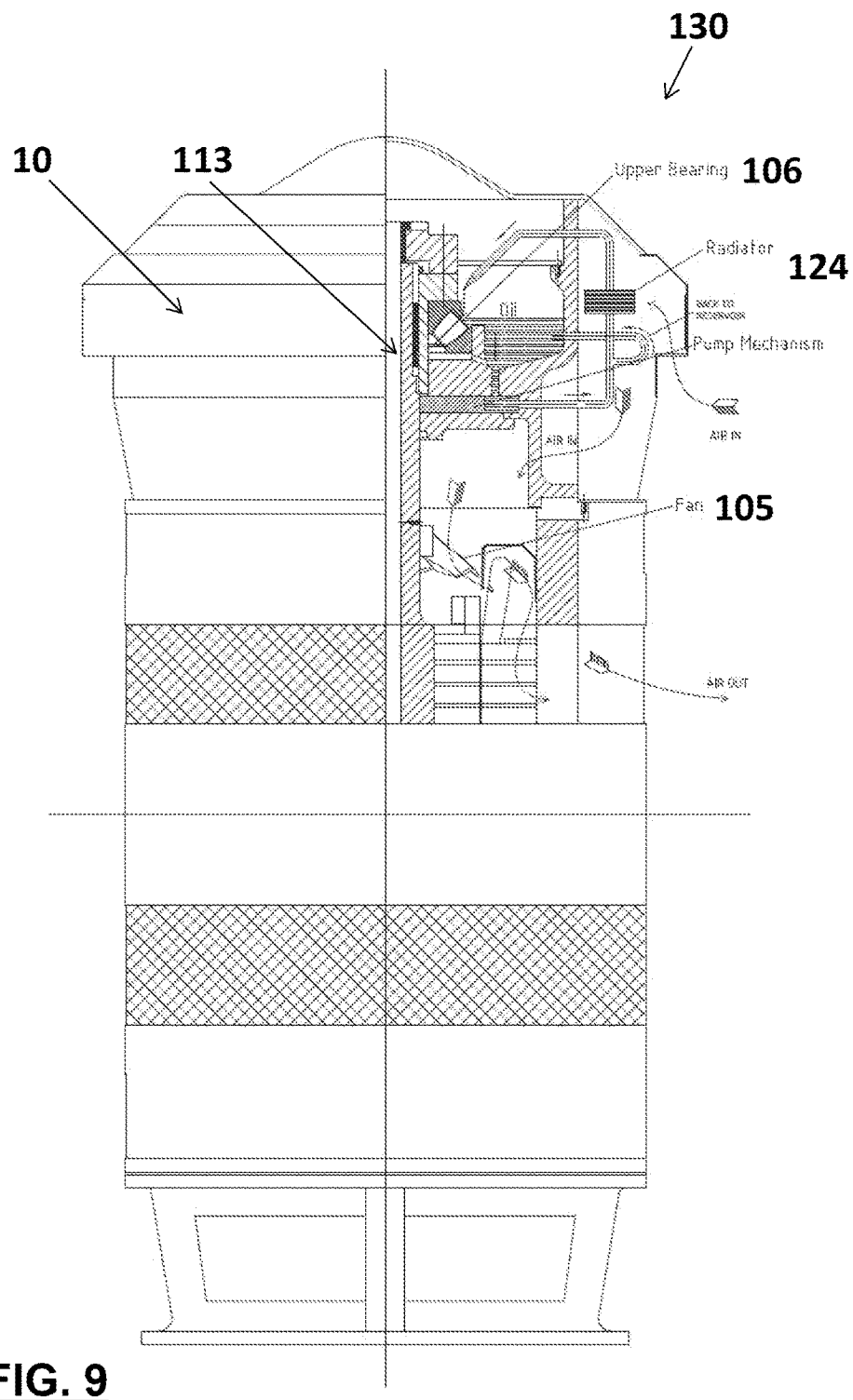
FIG. 9 is a partial cross-sectional side view of an illustrative embodiment of the invention including a self-lubricating motor bearing feature according to some preferred embodiments of the invention.
Figure 10:
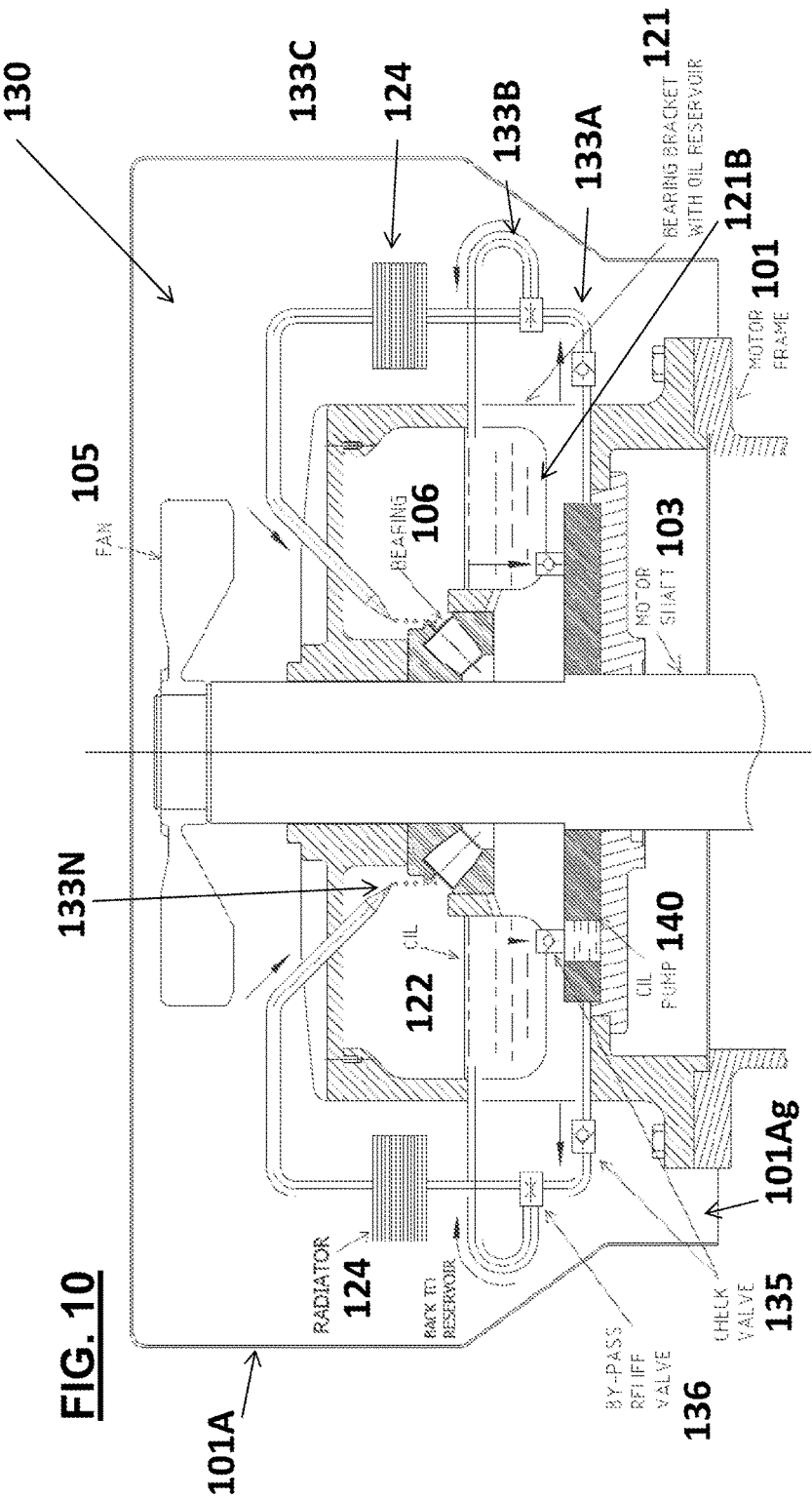
FIG. 10 is a partial cross-sectional side view of an illustrative embodiment of the invention similar to that shown in FIG. 9 including a self-lubricating motor bearing according to some preferred embodiments of the invention.

In this regard, FIG. 9 is a partially cross-sectional side view of an illustrative embodiment of the invention including a self-lubricated motor bearing feature 130 according to some preferred embodiments of the invention. FIG. 9 depicts an electric motor 10 as seen from outside the electric motor housing enclosure, but with a small portion of the enclosure depicted as cut-away at the upper right portion of the figure so as to demonstrate an illustrative location of the components of the self-lubricated motor bearing feature 130 according to some illustrative embodiments, which components are more plainly depicted in FIG. 10. In that regard, FIG. 10 is a partial cross-sectional side view of an illustrative embodiment of the invention similar to that shown in FIG. 9 including a self-lubricating motor bearing according to some preferred embodiments of the invention. However, similar to the differences between the above-described embodiments shown in FIGS. 6 and 7, the cross-section shown in FIG. 9 includes a different fan 105 placement location, as well as, e.g., a different motor shaft structure from that shown in FIG. 10. Towards that end, the embodiment shown in FIG. 9 includes similar fan 105 and shaft 113 structures to that shown in FIG. 6, while the embodiment shown in FIG. 10 includes similar fan 105 and shaft 113 structures to that shown in FIG. 7.

With reference to FIG. 10, in some preferred embodiments, a self-lubricated motor bearing feature 130 includes a bearing bracket 121 containing oil 122 in a similar manner as in the self-cooled motor bearing embodiments described above. In the preferred embodiments, an oil pump 140 is provided that pumps oil 122 from the basin 121B within the bearing bracket 121, through a tubular passageway 133 leading to a discharge nozzle 133N such as to dispense lubricating oil 122 at a discharge position over the bearing 106 directing lubricating oil over the rollers within the bearing 106. In the embodiment shown in FIG. 10, two oil passageways 133 and two discharge nozzles 133N are depicted at opposite sides of the shaft 103. However, in other embodiments, the number of passages 133 and nozzles 133N can be varied based on circumstances. For example, some embodiments can include only a single return passageway 133 and a single discharge nozzle, while some embodiments can include three, four, or more return passages and discharge nozzles distributed around the bearing 106.

In the preferred embodiments, the oil pump 140 is driven by the motor 10 itself, without any further drive mechanism, and, most preferably, the oil pump 140 is driven by the rotation of the motor shaft 113. In some embodiments, the oil pump can be any known pump capable of converting rotational movement of the shaft 113 into an oil pumping force. By way of example, the oil pump 140 can include one or more of any of the following known types of pumps: gear pumps; screw pumps; lobe pumps; peristaltic pumps; centrifugal pumps; and/or any other known pumps. In some preferred embodiments, the oil pump 140 is a ring gear pump. In some illustrative examples, a ring gear pump similar to that shown in U.S. Pat. No. 5,738,501, the entire disclosure of which is incorporated herein by reference, can be employed. For illustrative purposes, FIGS. 12 and 13 help to schematically illustrate how an illustrative ring gear pump can operate in some illustrative embodiments. In this regard, the illustrative ring gear pump shown in FIGS. 12 and 13 include an inner ring gear 141 having a plurality of outwardly extending gear teeth (i.e., 14 teeth in the example shown in FIG. 12 and 8 teeth in the example shown in FIG. 13) and an outer ring gear 142 having a plurality of inwardly extending gear teeth (i.e., 17 teeth in the example shown in FIGS. 12 and 12 teeth in the example shown in FIG. 13). In some embodiments, the inner ring gear 141 is fixed directly or indirectly to the motor shaft 113 so as to cause the inner ring gear 141 to rotate around its central axis along with the rotation of the motor shaft (e.g., co-axially with the motor shaft in some illustrative embodiments). In this regard, the outer ring gear is preferably mounted to the inner ring gear in such a manner that the teeth of the inner ring gear 141 and the outer ring gear 142 mesh at all times. As such, during rotation of the inner ring gear 141 in, for example, the direction of the arrow R shown in FIG. 13, the outer ring gear is caused to rotate in the direction of the arrow D shown in FIG. 13. As a result, the region AR between the inner and outer ring gears will be subject to compression (i.e., reducing the volume as the teeth converge) and the region AX between the inner and outer ring gears will be subject to expansion (i.e., increasing the volume as the teeth separate), which compression and expansion enable a pumping operation by locating inlet and outlet ports proximate such locations AR and AX to effect pumping.

As shown in FIG. 10, the oil 122 preferably enters the oil pump 140 via a check valve 135 (e.g., a one-way valve that allows flow into the oil pump 140 but that restricts return flow from the oil pump 140). The oil is then discharged from the oil pump 140 into the first section 133A of the tubular passageway 133. As shown, the first section 133A of the passageway 133 preferably includes another check-valve 135 (e.g., another one-way valve that allows flow away from the oil pump 140 but that restricts return flow to the oil pump 140). The first section 133A of the passageway extends to a radiator 124. While any known radiator structure can be employed that enhances radiation of heat, in some embodiments, the radiator is configured such as to increase the surface area via which heat is transferred. By way of example, the radiator 124 can be configured such as to have an increased surface by providing, e.g., a plurality of fins or the like to enhance heat transfer from the hot oil passing through the interior of the radiator. As also shown in FIG. 10, the passageway 133 also preferably includes a bypass section 133B that leads from a by-pass relief valve 136 within the first section 133A and back to the basin 121B. In the preferred embodiments, the by-pass relief valve 136 operates so as to allow excess oil 122 to flow through the by-pass relief valve 136 through the bypass section 133B and back to the reservoir 121B when the volume and/or pressure within the by-pass relief valve 136 exceeds a certain threshold value. In this manner, any exceedingly high flow rate or pressure from the pump 140 can be dissipated via the by-pass relief valve 136 and bypass section 133B. Otherwise, oil 122 that is not by-passed via the by-pass relief valve 136 is free to flow through the passageway 133 to the radiator 124, and from the radiator 124 to the last section 133C and back into the bearing bracket (e.g., via a hole through which the last section 133C passes), and back to the bearing 106 via the nozzle 133N.

As with the embodiments related to the self-cooled motor bearing feature described above, in the preferred embodiments of the self-lubricated motor bearing feature, at least one fan 105 is preferably provided in order to create a forced airflow to enhance heat transfer from the radiator due to air flow (e.g., increased convection). In the preferred embodiments, the fan 105 does not include an external drive source, but includes fan blades that are fixedly attached such as to rotate with the rotation of the motor shaft 113. As with the above-described embodiments shown in, e.g., FIGS. 6 and 7, the housing 101 of the motor 10, preferably includes air passages that allow for air to flow in-and-out of the motor 10 in order to ensure that heated air is conveyed out of the motor 10 with the air that is circulated through the housing 101. As shown in the illustrative example in FIG. 10, an air gap 101Ag can be included to allow for such air flow.

Figure 11:
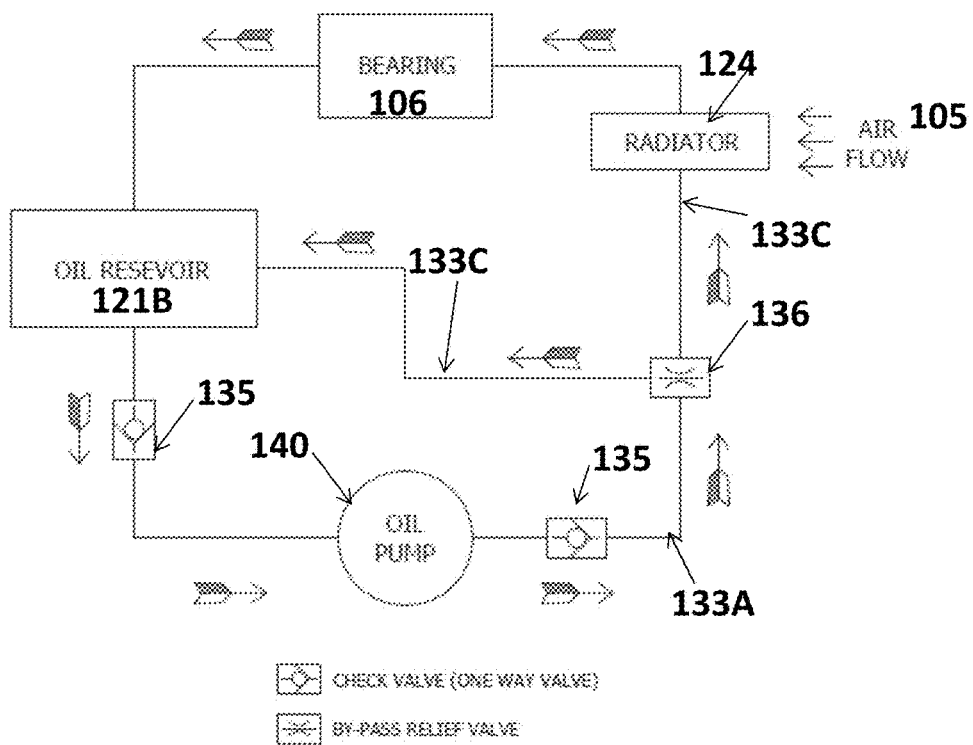
FIG. 11 is a schematic diagram demonstrating the operation of a self-lubricating motor bearing according to some preferred embodiments of the invention.
Figure 12:
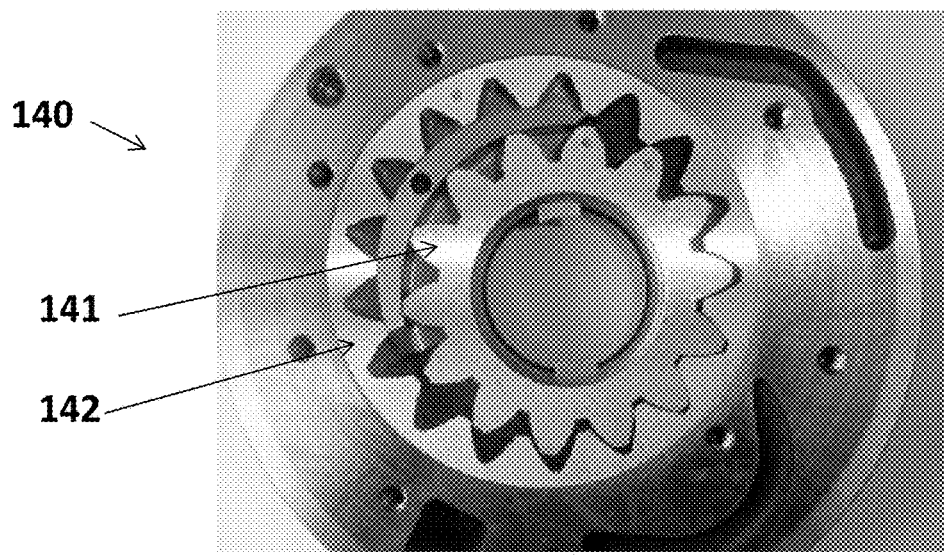
FIGS. 12 and 13 show illustrative components of an oil pump that can be employed according to some preferred embodiments of the invention.
Figure 13:
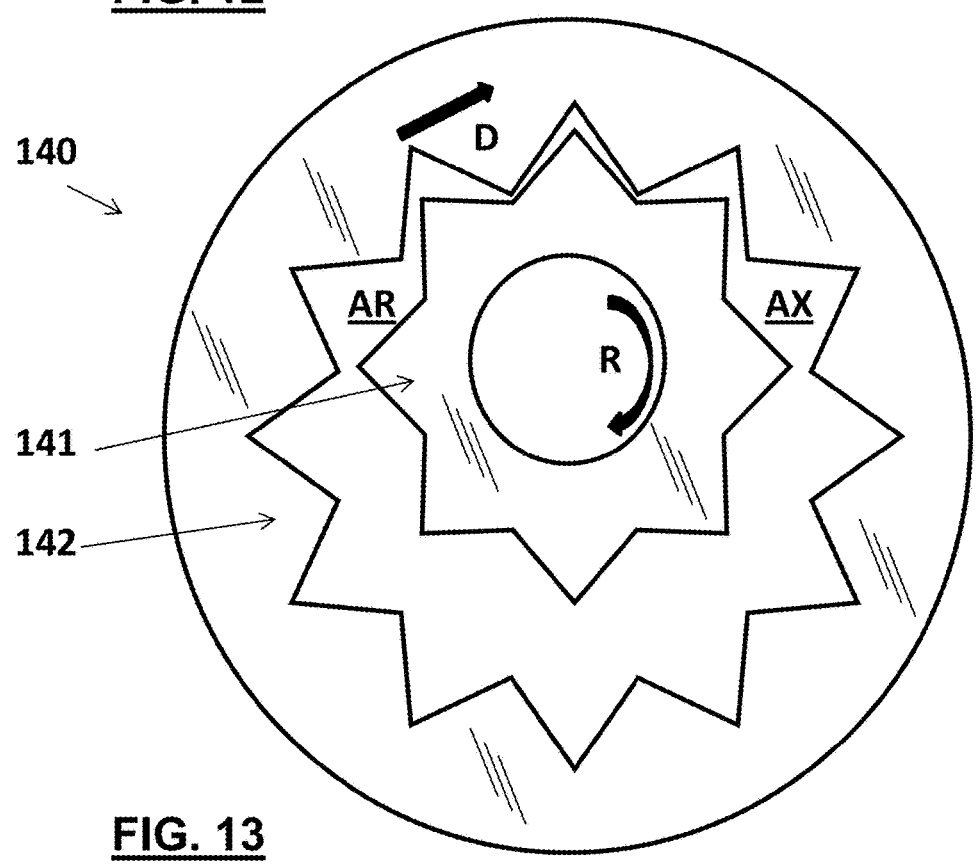

For further reference, FIG. 11 is a schematic diagram demonstrating the operation of a self-lubricating motor bearing feature according to some preferred embodiments of the invention. As shown in FIG. 11, oil contained within the reservoir or basin 121 is sucked out of the reservoir by the oil pump 140 through a first one-way check valve 135 and is pushed forward through the first section 133A of the passageway 133 towards the radiator 124. The airflow over the radiator 124, enhanced by the fan 105, reduces the temperature of the oil within the system and continues onward and is returned to the bearing 106. As also shown, a by-pass relief valve 136 is situated within the first section 133A which redirects excess oil via the by-pass relief valve 136 through the by-pass section 133C and into the oil reservoir or basin 121B.

As indicated above, in the preferred embodiments, the self-lubricating motor bearing feature and/or the self-cooling motor bearing feature is/are employed within a heavy duty industrial electric motor, such as, e.g., employed within deep-Earth applications, such as, e.g., in which water is pumped from deep within the Earth for irrigation and/or for geothermal energy. In view of, e.g., the highly corrosive nature of gases released from such deep Earth environments, in the preferred embodiments, the components of these features are made with highly corrosion resistant materials. By way of example, in some of the preferred embodiments, the fan(s) 105, the thermosiphon tubing 123, the oil pump 140 (such as, e.g., the ring gears of a ring gear pump), the passages 133A, 133B and 133C, the radiators 124, the bearing brackets 121 and/or other parts are made of stainless steel.

Although the illustrated self-lubricated motor bearing feature depicted in FIGS. 9-11 includes an integrated self-cooling component (such as, e.g., the implementation of the radiator 124) for cooling the oil that is returned to the bearing 106, it is contemplated that in some embodiments, the self-lubricated motor bearing feature can omit such a self-cooling component. However, the preferred embodiments of the self-lubricated motor bearing feature include this self-cooling component. Moreover, as discussed above, in the most preferred embodiments, the self-lubricated motor bearing feature is also incorporated within a motor along with the above-discussed self-cooling motor bearing feature of the first inventive aspect. Among other things, by integrating both the self-lubricating motor bearing feature and the self-cooling motor bearing feature in the same motor, the system can achieve the benefits of both of these features.

Figure 14:
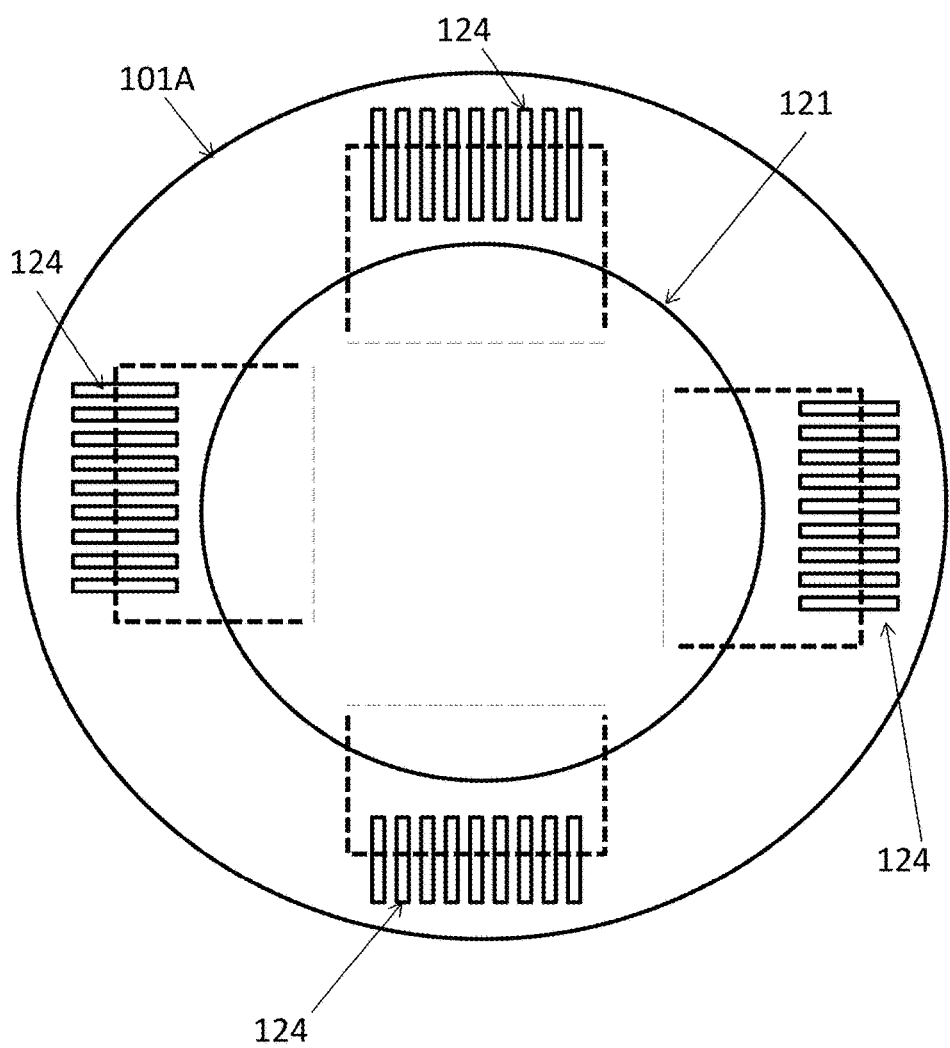
FIG. 14 is a schematic top view depicting an illustrative arrangement of radiators in an illustrative embodiment employing both a self-cooled motor bearing feature and a self-lubricated motor bearing feature according to some illustrative embodiments.

Moreover, by integrating both the self-lubricating motor bearing feature and the self-cooling motor bearing feature in the same motor, the system can achieve synergistic benefits of the combined system, such as, e.g., the combined cooling capabilities of the two systems (e.g., the cooling component of the self-lubricated motor bearing system further enhancing the cooling of the self-cooling motor bearing system feature). Moreover, the pumping of the oil 122 can help to increase oil flow within the basin 121B and, hence, heat transfer to the thermosiphon. Moreover, as both of these features incorporate common elements (such as, e.g., radiators 124, fans 105, and a bearing bracket 121), when these self-lubricating and self-cooling features are combined, some or all of these common feature can, thus, efficiently serve multiple purposes and do not require duplication. For example, it should be appreciated that the same fan 105 and the same bearing bracket 121 would be employed in the preferred embodiments. However, it is also contemplated that in some embodiments the same radiator 124 can be used to effect cooling for the thermosiphon in the self-cooling feature and for the returned oil 122 in the self-lubricating feature. By way of example, in some embodiments, the thermosiphon tube 123 and the passageway section 133C can extend through the same set of radiator fins. However, it should be understood that in some embodiments, the radiator(s) 124 employed within the self-cooling feature and the radiator(s) 124 employed within the self-lubricating feature can be separate and independent radiators. In this regard, for illustrative purposes, FIG. 14 is a schematic top view depicting an illustrative arrangement of radiators in an illustrative embodiment employing both a self-cooled motor bearing feature and a self-lubricated motor bearing feature according to some illustrative embodiments. For example, such an embodiment can include, for example, a plurality of the radiators 124 for the self-lubricated bearing feature and a plurality of the radiators 124 for the self-cooled bearing feature located within the air-flow space in between the bearing bracket 121 and the housing enclosure top cover 101A. In FIG. 14, the components of the thermosiphon tubes 123 and the passageways 133 are represented by the dashed lines, and it should be understood that such components are depicted for reference only in this figure and can be constructed as detailed with respect to the above-described embodiments.

Broad Scope of the Invention

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

What is claimed is:

1. A system including a vertical electric motor having a self-lubricating motor bearing component, comprising:
    (a) a vertical motor shaft;
    (b) a rotor and a stator surrounding said vertical motor shaft and cooperatively causing said vertical motor shaft to rotate;
    (c) a bearing bracket supported around said vertical motor shaft at a position above said rotor and stator, said bearing bracket including:
        (i) a through-hole through which said vertical motor shaft is rotatably received via a bearing;
        (ii) a support surface supporting said bearing;
        (iii) an oil reservoir extending lower than said bearing containing lubricating oil for said bearing;
    (d) a self-lubricating motor bearing component including:
        (i) at least one pump arranged to pump oil from said oil reservoir through at least one oil passageway to at least one discharge position located over said bearing, said at least one oil passageway including a by-pass relief valve and a by-pass section leading from said by-pass relief valve to said oil reservoir, wherein excess oil flow is dissipated via the by-pass relief valve and by-pass section to the oil reservoir;
        (ii) said pump being powered by rotation of said vertical motor shaft;
    (e) a housing enclosure surrounding said vertical motor shaft, said bearing bracket and said self-lubricating motor bearing component, said housing enclosure including at least one opening allowing airflow to and from said housing enclosure;
    wherein said at least one oil passageway further includes a passageway through which oil that is not by-passed via the by-pass relief valve flows to a radiator and then to a discharge nozzle located over said bearing; and
    wherein said pump is a ring gear pump having an inner ring gear fixed to said vertical motor shaft.

2. The system of claim 1, further including a self-cooling component, wherein said self-cooling component includes said radiator arranged to impart cooling heat transfer to the oil circulated via said pump.

3. The system of claim 2, wherein said self-cooling component includes: (i) said at least one oil passageway being configured to direct said oil to said radiator prior to discharge via said discharge nozzle; and (ii) at least one fan arranged to direct cooling airflow over said at radiator, said at least one fan being rotated via said vertical motor shaft.

4. The system of claim 1, wherein said system includes at least one underground pump configured to pump water from deep within the Earth.

5. The system of claim 4, wherein said underground pump is configured to pump hot water for heat energy within a geothermal power plant.

6. The system of claim 1, wherein said electric motor is configured to withstand thrust loads of over 10,000 lbs.

7. The system of claim 1, wherein said electric motor is configured to withstand thrust loads of over 25,000 lbs.

8. The system of claim 1, wherein said housing enclosure includes a cover that encloses a fan, which is fixed to a distal end of said vertical motor shaft, said bearing bracket, said bearing and said oil reservoir at a position above said rotor and stator, said cover having an air gap under an outer edge to facilitate air flow out of the cover from said fan fixed to the distal end of said vertical motor shaft.

* * * * *